INVENTORS: J. G. KREER
E. PETERSON
BY Harry C. Hart
ATTORNEY

Oct. 31, 1950 J. G. KREER, JR., ET AL 2,527,638
PULSE SKIP SYNCHRONIZATION OF
PULSE TRANSMISSION SYSTEMS
Filed Sept. 26, 1947 2 Sheets-Sheet 2

INVENTORS: J. G. KREER
E. PETERSON
BY Harry C. Hart
ATTORNEY

Patented Oct. 31, 1950 2,527,638

UNITED STATES PATENT OFFICE 2,527,638

PULSE SKIP SYNCHRONIZATION OF PULSE TRANSMISSION SYSTEMS

John G. Kreer, Jr., Bloomfield, N. J., and Eugene Peterson, New York, N. Y., assignors to Bell Telephone Laboratories, Incorporated, New York, N. Y., a corporation of New York Application September 26, 1947, Serial No. 776,280

15 Claims. (Cl. 179—15)

This application relates to communication by pulse code transmission and particularly to the synchronization of receiver apparatus with transmitter apparatus.

A pulse code transmission system is one in which instantaneous amplitude values or "samples" of a message, for example the voice wave of a telephone conversation originating at a transmitter station, are translated into pulse code groups, transmitted in that form to a receiver station, and there decoded or translated into the original message form for delivery to the listener. Such systems have certain known advantages, as compared with more conventional systems, among which are their remarkable freedom from interference and their easy adaptability to time division multiplexing. It is necessary, however, in order to prevent excessive cross-talk and degradation, that the receiver apparatus be maintained in substantially perfect synchronism with the transmitter apparatus. To this end it is known to transmit, in addition to the message information, certain synchronizing information, for example in the form of marker pulses recurring in a preassigned sequence, which holds the receiver apparatus in step with the transmitter apparatus at the correct frequency and in the correct phase. One expedient for securing this result involves the provision at the transmitter of a multivibrator circuit controlled as to its pulsing frequency by a basic timing source and, at the receiver, another multivibrator circuit which is similar except for the fact that its free running frequency is slightly less than the frequency of the transmitter apparatus. Normally, the received marker pulses are injected into this multivibrator and hold it in step with the transmitter multivibrator so that the entire receiver apparatus remains correctly synchronized with the transmitter and correctly framed. If for any reason the receiver should fall out of step with the transmitter then, by reason of its lower free running frequency, it drifts with respect to the transmitter until it is once more in alignment, at which time the marker pulse, if sufficiently strong, seizes control and holds it in step.

In the design of such a system, a compromise must be made between two incompatibles. For certainty of locking in step after a temporary drop-out, the frequency difference between the transmitter pulsing frequency and the free running frequency of the receiver multivibrator must be small and the synchronizing or marker pulse must be strong. This means a slow receiver drift during the drop-out and the allotment of a substantial amount of frequency space to the synchronizing pulses. If an effort be made to conserve frequency space by weakening the synchronizing pulses or to reduce hunting time by increasing the multivibrator frequency difference, then there arises the possibility of an over-shoot, with resulting loss of time.

It is a specific object of the present invention to remove the necessity for a choice between these two incompatibles. A more general object is to increase the speed and certainty of operation of the hunting process in a pulse code receiver system which may have fallen out of step. A related object is to maintain synchronism of a pulse code receiver with a pulse code transmitter, and to restore it when it has been temporarily lost, with synchronizing or marker pulses requiring a minimum of frequency band width or channel space for transmission.

These and other objects are attained, in accordance with the invention, by departing from the principle of the drifting multivibrator and providing, instead, as the basic receiver timing source a distributor which is advanced in step-by-step fashion by the incoming pulses of the message code pulse groups themselves. This state of affairs persists as long as the receiver is correctly framed. If, for any reason, the receiver should momentarily fall out of step, then, by virtue of the circuit arrangements to be described, certain of the stepping pulses, for example, 1 in 840, are withheld from the receiver ring stepper so that it immediately falls back by one step and thereafter remains at that relative position during the ensuing 839 pulses. In this interval it tests one particular pulse position of the incoming pulse sequence for the marker pulse. If it finds the latter properly located, the receiver remains in step. If it does not find the marker pulse properly located, the next pulse to arrive after the 840 above referred to is likewise withheld from the stepper, and so on, each pulse position being investigated in turn, until correct framing has been restored. Normally the hunting process is completed in one-tenth second or less, so that, before the subscribers become aware that the system is not in frame, correct framing will have been restored. In case the hunting system should fail to operate at this high speed, provision is made to block the message signal line during the hunting process so as to prevent incorrect routing of message information.

In accordance with another aspect of the invention, the synchronizing information consists merely of a marker pulse appearing in only one of a number of multiplexed channels and, in that one channel, superposed on the least important one of the pulses of each code group. Thus a regularly recurring time pattern is secured, in which the synchronizing information is contained, with a minimum of degradation of the message information in a single channel, and without imposing any adidtional band width requirements on the transmission medium.

The invention will be fully apprehended from the following detailed description of a preferred embodiment thereof taken in connection with the appended drawings in which.

Figure 1:
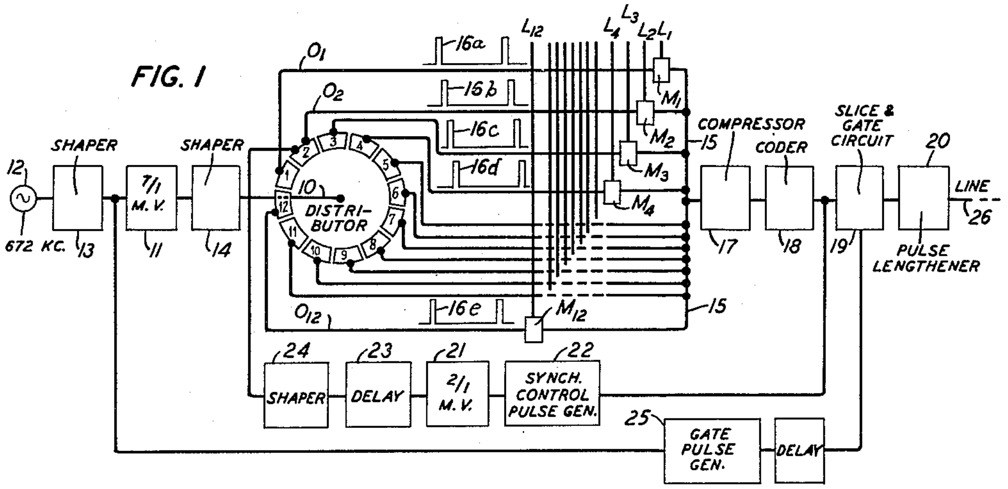
Fig. 1 is a schematic diagram of a time division multiplex pulse code transmission system in accordance with the invention.
Figure 4:
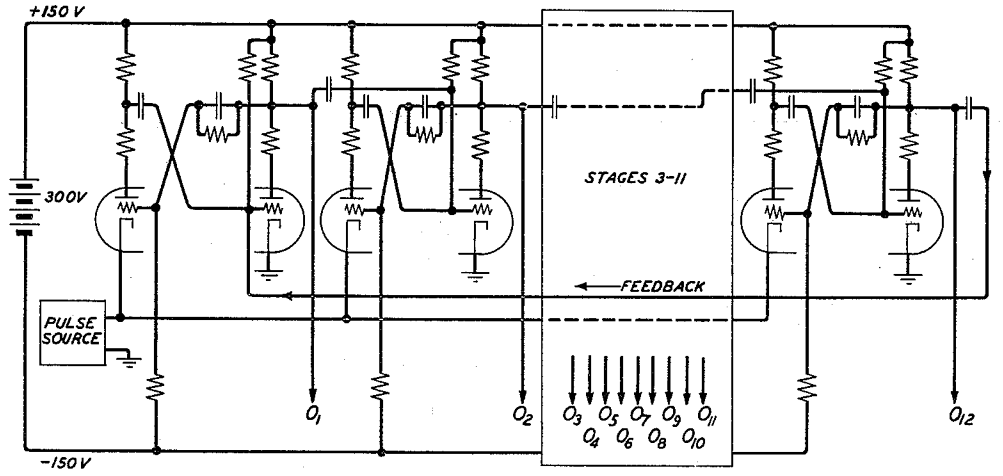
Fig. 4 is a circuit diagram of a ring circuit distributor as employed in the apparatus of Figs. 1 and 2 and there indicated schematically.

Referring now to the drawings:

Fig. 1 shows a group of twelve incoming lines $L_1$, $L_2$, etc., connected respectively to modulators or samplers $M_1$, $M_2$, etc. These lines may be considered as carrying telephone messages which are to be multiplexed and coded. To this end of the samplers $M_1$, $M_2$, etc., is connected at one side to a common bus and at the other side to one stage of a twelve-stage distributor. The distributor may take various forms, but it is preferred to employ a ring circuit as illustrated in Fig. 4. This twelve-stage ring circuit comprises a set of twelve intercoupled multivibrators, each consisting of a pair of intercoupled discharge tubes, the output of the last stage being coupled back to the first stage. Input control pulses are applied to the left-hand cathodes of all stages in parallel. Output pulses $O_1$, $O_2$, etc., which actuate the several samplers $M_1$, $M_2$, etc. are taken from the right-hand anodes of the several stages. As is well known, the conduction condition of such a ring circuit may be stepped along the ring stage by stage, under control of the input pulses. For the sake of simplicity, the ring circuit is illustrated in Fig. 1 merely as a group of twelve numbered stages arranged in a circle, and controlled in step-by-step fashion by driving pulses applied to it by way of a conductor 10. The input control pulses are the output pulses of a frequency divider 11 which derives the sampling frequency from the base pulse frequency under control of a basic timing source 12. The basic timing source 12 may, for example, be a piezoelectrically controlled oscillator, delivering a voltage wave of 672 kilocycles per second frequency. The frequency divider 11 may conveniently be a multivibrator of the type disclosed in United States Patent 2,022,969 to L. A. Meacham, in which the free running frequency is somewhat less than one-seventh of 672 kilocycles. The controlling wave from the basic timing source provides a series of impulses at the frequency of 672 kilocycles per second on the grids of the two tubes of the multivibrator. During the greater part of the multivibrator cycle these pulses have little effect; but near the end of the half cycle, as the multivibrator enters the critical condition, the margin of stability diminishes until finally one of the controlling impulses is sufficient to "trip off" the transient and start a new half cycle. By choosing the parameters of the circuit to produce slightly different time constants for the two tubes, the first tube may be caused to trip after three controlling impulses and the second after four, thus slightly altering the lengths of the two "half" cycles. This action being repeated regularly, the multivibrator 11 delivers output pulses at the submultiple frequency of seven to one. To accentuate the positiveness of the tripping action of the multivibrator 11 by the source 12, and of the ring circuit by the multivibrator 11, pulse shapers 13 and 14 may be interposed.

The samplers $M_1$, $M_2$, etc., may be pulse-controlled electronic switches of any desired type. Their function is merely to establish a low impedance path between each of the message lines $L_1$, $L_2$, etc., in rotation, and the bus 15. This low impedance path is established each time the particular sampler $M_1$, $M_2$, etc., receives a pulse from the particular stage of the ring circuit to which it is connected. The sequential nature of these pulses is indicated by the pulse wave forms 16*a*, 16*b*, 16*c*, 16*d*, 16*e* on the figure. A preferred type of electronic switch for this purpose is the so-called diode clamp circuit, one form of which is shown and described in the Review of Scientific Instruments for October 1946, at page 396.

Though by no means necessary it is of advantage to employ instantaneous volume compression and expansion in a transmission system such as the present one. Therefore, at the transmitter, the successive signal samples of the several messages are next passed through a compressor unit 17 of any suitable type, for example, one having a characteristic which follows approximately a cube root law as taught in United States Patent 1,737,830 to G. Crisson. A silicon varistor unit can be constructed to have closely this characteristic.

After volume compression the compressed signal samples are next coded in any desired manner. For example, they may be translated into pulses whose duration or location on the time scale is proportional to the signal sample amplitude. However, it is of particular advantage in connection with the present invention to translate the signal samples into code groups of on-or-off pulses, i. e., into a binary code. Such a code may have any number of digits dependent on the fidelity of transmission which is required and the transmission band width which is available. Experience has shown that a seven-digit code gives fidelity which is more than sufficient for telephone purposes, and accordingly a seven-digit binary code is here selected for purposes of illustration. It is the number of digits in the code, i. e., seven, which determines the step-down ratio of the frequency divider 11, whose function is to derive the sampling frequency from the basic pulse frequency.

The coder 18 itself may be of any desired type, although a particularly appropriate one is shown and described in articles published in the Bell System Technical Journal for January, 1948, vol. 27, pages 1 and 44, and also in R. W. Sears Patent No. 2,458,652 of January 11, 1949. It comprises a cathode beam tube having a coding mask in the form of a plate containing a plurality of separate rows of apertures, toward which the beam is directed. The number of "virtual" apertures of each row is equal to the number of digits of the code. The beam is deflected across the mask in proportion to the signal sample, and is then swept across the apertures of a particular row by a saw-tooth sweep voltage. The arrangement of the "real" apertures in any particular row is unique and therefore the particular pulse sequence which results from passage of the electron beam through the apertures of this row in sequence is uniquely related to the particular beam deflection and therefore to the particular message sample amplitude being coded.

With a seven-digit binary code, it is apparent that, for each message signal sample there are seven separate pulse positions along the time scale, some of which are occupied and some unoccupied, in dependence on the particular code group. In other words, the code pulse repetition rate for a single channel is seven times as great as the signal sampling rate. For a number of interlaced channels, it is still greater, as explained below.

In order that the code pulses to be transmitted shall be standardized in amplitude, width, and location along the time scale, it is preferred to regenerate them immediately after coding. To this end a slicer-gater circuit 19 may be provided to slice the code pulses at a preassigned level and to gate them at preassigned regularly recurring instants. The gating pulses for this purpose are delivered by a gate pulse generator 25 of any suitable type which may be controlled as to its pulsing frequency by the basic timing generator. The slicing and gating circuit may be of any suitable type, but a preferred system is the one described in the first of the aforementioned Bell System Technical Journal articles, especially at page 29, and claimed in an application of L. A. Meacham, Serial No. 772,913, filed September 9, 1947, now Patent No. 2,527,638.

Figure 3:
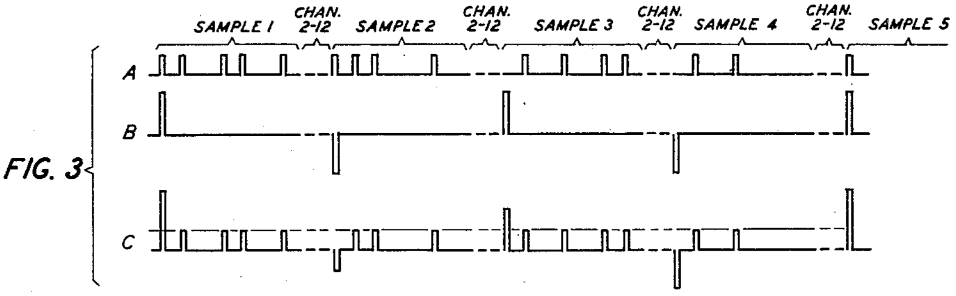
Fig. 3 is a wave form diagram of assistance in describing the action of the apparatus of Figs. 1 and 2.

In the seven-digit binary code system, the first digit represents 1, the second 2, the third 4, the fourth 8, the fifth 16, the sixth 32 and the seventh or last digit represents 64. Thus, referring to Fig. 3 and assuming that the first sample of the channel No. 1 message has a value 91, the second sample has the value 39, the third sample has the value 106 and the fourth sample has the value 10, corresponding code groups of pulses will appear as diagrammed at A.

In accordance with the invention, a suitable synchronizing signal or marker pulse is superposed on a message code group. This may be done in various ways, but a particularly suitable and convenient one is the following. A pulse derived from one stage of the ring circuit is applied to a frequency divider, for example, a 2 to 1 step-down multivibrator 21 of the type described in the L. A. Meacham patent above referred to. The output pulses of this multivibrator control a synchronizing control pulse generator 22 which provides sharp, narrow pulses of substantial amplitude, as compared with the code pulses, negative peaks alternating with positive peaks as diagrammed at B in Fig. 3. These pulses are brought into time coincidence with the first digit pulses of channel No. 1 in part by selecting the ring stage (No. 2) from which they are derived, to over-compensate for the delay in other parts of the system and in part by the insertion of a delay device 23 to compensate for this excess. The resulting wave, curve B, is then added to the output of the coder (curve A) to produce a sequence of pulses as indicated in the curve C. Here it appears that the positive synchronizing pulses, because they are always greater than the message code pulses, greatly increase the amplitudes of the latter, while for the same reason the negative synchronizing pulses completely mask or obscure the message code pulses when they coincide. The slicer 19 next removes everything above a preassigned slicing level and entirely eliminates all negative pulses. The resulting pulse sequence applied to the line contains, at the positions nominally occupied by the first digit pulses of channel No. 1, an alternating sequence of on-and-off pulses. In the particular system shown, with the basic timing source operating at 672 kilocycles, the stepping rate of the ring circuit is one-seventh of this or 96 kilocycles and the sampling rate for each of the twelve channels $L_1$, $L_2$, etc. is 8 kilocycles. The synchronizing pulses recur regularly at a frequency of 4 kilocycles.

To avoid making excessive demands on the frequency band width of the transmission system the pulses of this sequence may now be applied to a pulse lengthener 20 of any suitable type which spreads out each pulse until it approximately fills all the space on the time scale which is allotted to it. A suitable pulse lengthening circuit in which a delayed replica of the pulse to be lengthened is produced by a delay device such as a short-circuited transmission line and is then located immediately alongside the original pulse on the time scale is described in United States Patent 2,457,559 to G. H. Huber.

The resulting sequence of lengthened pulses is next transmitted over any suitable broad band transmission medium, schematically indicated by the outgoing line 26 to a receiver station where it appears on an incoming line 27. The pulses are reduced to a standard level by a slicer 28 translated again to amplitude samples by a decoder 29, passed through the switch $S_5$ which is normally closed, restored to their original volume relation by an expander 30 in the manner explained in the G. Crisson patent above referred to, and distributed to their respective outgoing telephone lines $L_1'$, $L_2'$, etc. by a distributor. The decoder may be of any suitable type, but one which is preferred on account of its simplicity is described in the first of the aforementioned Bell System Technical Journal articles pages 36 to 40. Briefly, it comprises a condenser which is instantaneously charged by each pulse of the incoming train, and discharged continuously and exponentially at a rate such that the charge due to any pulse has decayed to one-half its value in one pulse period. Thus when all the incremental charges corresponding to all the pulses of a code group have been applied in succession, the first has decayed to $^1/_{64}$ of its original value, the second to $\frac{1}{32}$, the third to $\frac{1}{16}$, the fourth to $\frac{1}{8}$, the fifth to $\frac{1}{4}$, the sixth to $\frac{1}{2}$ and the seventh not at all. Immediately following the addition of the incremental charge corresponding to the last pulse of the code pulse group, the total condenser charge is measured and a voltage proportional to it is derived. This voltage because of the relations just explained, is proportional to the original signal sample as coded at the transmitter.

It is necessary in such a decoder that the condenser charge be measured at the correct instant, namely after addition of all of the charges of a pulse code group. If it were measured, instead, after the addition of the first, second, third, fourth, fifth or sixth pulse, incorrect decoding would result. To measure the condenser charge after the addition of charges corresponding to seven code pulses, and to assure that the measurement is made at the conclusion of a group and at no other time, the decoder is supplied over a conductor 31 with control pulses at one-seventh of the basic pulse rate, and these control pulses are correctly timed in the manner more fully discussed below.

The distribution may likewise be carried out by any suitable means. It is preferred, for reasons which will appear more fully below, to employ a ring circuit which may be identical with the transmitter ring circuit shown in Fig. 4, the several stages of which supply output pulses $O_1'$, $O_2'$, etc. to demodulators or electronic switches $D_1$, $D_2$, etc. while the ring itself is actuated by pulses which reach it by way of a conductor 32. When the receiver is synchronized and correctly framed, the switch $D_1$ is actuated at the instant at which the decoded and expanded sample originating in channel $L_1$ arrives at the switch $D_1$ and this sample is therefore routed over the outgoing line $L_1'$. Similarly with respect to samples originating in other channels and to the later samples originating in channel $L_1$. However, in order that this routing be correctly accomplished, it is essential that the receiver ring circuit be correctly synchronized with the transmitter ring circuit and correctly aligned with it at all times or "framed."

Assuming the receiver ring circuit to be correctly framed, it is maintained in that condition by the application thereto of stepping pulses which are derived from a 672-kilocycle source, in precisely the same manner as the transmitter. The 672-kilocycle source at the receiver is not independently operative, but comprises, rather, a differentiating circuit 35, a rectifier 36, and a 672-kilocycle narrow band filter 37 connected in tandem to the incoming line 27 following the pulse slicer 28 in the manner shown. A sequence of coded pulses such as that indicated in curve C of Fig. 3 contains a strong 672-kilocycle component, but due to the action of the pulse-lengthener 20 at the transmitter station, this component is largely obscured. However, it can easily be recovered by the combination shown. The differentiator 35 produces a sharp pip of one sign whenever a blank pulse position follows a pulse and a like pip of opposite sign whenever a pulse follows a blank pulse position. The rectifier 36 eliminates all the pulses of one sign, retaining those of the other sign. The resulting sequence of pips is passed though the narrow band filter 37 which attenuates all components other than the 672-kilocycle component which is thus recovered. The latter is applied, after being sharpened by a shaper 38 by way of a switch $S_1$ in the position shown by the solid line, to the control of a suitable frequency divider such as a 7 to 1 step-down multivibrator 40 whose output, after being similarly sharpened by a shaper 41 steps the receiver ring circuit around stage by stage. The 7 to 1 output also, through a shaper 42 supplies control pulses by way of the conductor 31 to the decoder 29. Delay devices 39, 43 may be interposed to compensate for delays in other parts of the system.

Figure 2:
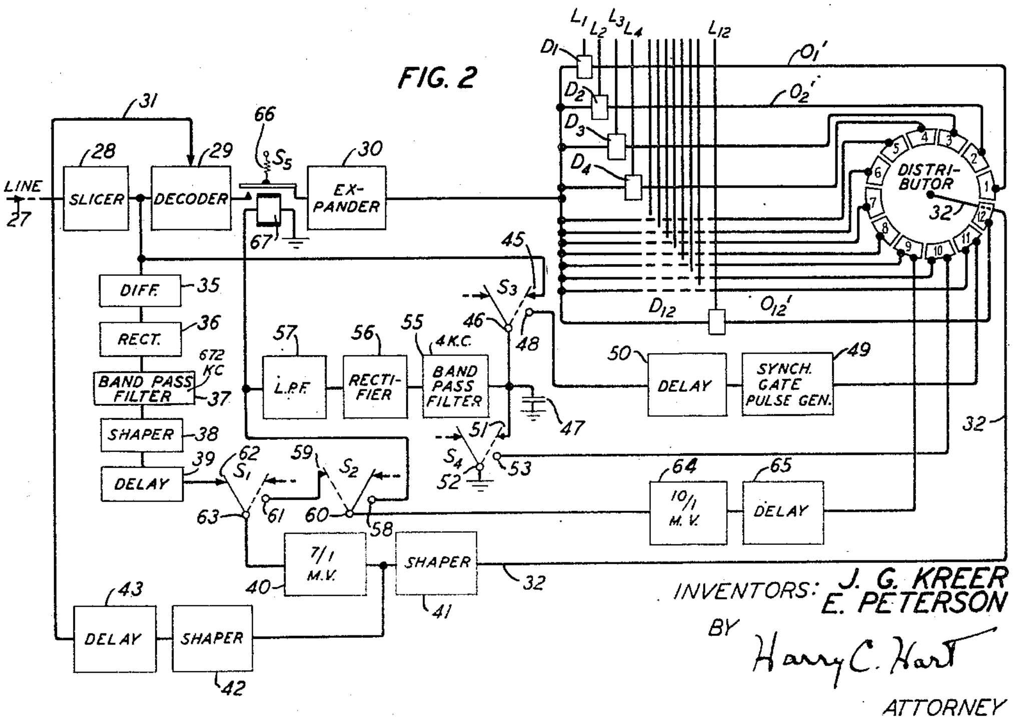
Fig. 2 is a schematic diagram of receiver apparatus for the reception, translation and distribution of information transmitted by the apparatus of Fig. 1.

If for any reason, such as a failure of transmission, the decoder 29 and ring circuit at the receiver should drop out of step with the coder 18 and ring circuit at the transmitter, provision must be made for restoring correct framing or alignment. The same is true when the transmission system as a whole is started from rest, in which case the alignment of the receiver with the transmitter is arbitrary. The circuits which, in accordance with the present invention, perform this function are shown in the center part of Fig. 2 in block schematic form and include, in particular, the switches $S_1$, $S_2$, $S_3$, $S_4$, all of which are shown in greater detail in Fig. 5. One conduction terminal 45 of the switch $S_3$ is connected to the incoming line 27 following the pulse slicer 28 and therefore receives the incoming pulse sequence. The other conduction terminal 46 is connected to one terminal of a storage condenser 47 whose other terminal is grounded. The control terminal 48 of the switch $S_3$ is energized by a synchronizing gate pulse generator 49 with an adjustable delay device 50 interposed, by pulses from one of the twelve stages of the receiver ring circuit. Which particular one of these stages is chosen for the purpose depends upon the amount of accumulated delay in the entire system, and is best determined by trial. In the example shown, stage No. 11 has been selected.

The storage condenser 47 is also connected to one conduction terminal 51 of the switch $S_4$, whose other conduction terminal 52 is grounded. The control terminal 53 of this switch is energized by pulses derived directly from another stage of the receiver ring circuit, preferably the one immediately preceding the one whose pulses actuate switch $S_4$. In the present example, this is stage No. 10.

As a result of these connections, sharp pulses generated by the synchronizing gate pulse generator 49 and recurring at a rate of 8 kilocycles per second, in dependence on the recurrence rate of the conduction condition of the stage 11 of the receiver ring, are applied to the control terminal 48 of switch $S_3$, and each pulse closes this switch briefly. When the switch is closed, the storage condenser 47 is charged to a potential proportional to the amplitude of that one of the pulses of the incoming sequence which is instantaneously present on its upper conduction terminal 45. This condenser 47 holds its charge until it is discharged by short-circuiting it to ground through closure of the switch $S_4$ by pulses originating in the next preceding stage (stage 10) of the receiver ring circuit. The condenser is thus prepared to receive a charge from a following pulse.

The condenser charge wave form thus consists of a sequence of steps of uniform amplitude and having a maximum recurrence rate of 8 kilocycles and each enduring for approximately $^{11}/_{12}$ of the 8-kilocycle period. When the receiver is not in frame these voltage steps are randomly distributed in time and hence their component at any particular frequency, e. g., 4 kilocycles, is very small. When the receiver is in frame, these steps recur at the rate of 4 kilocycles, which frequency is therefore the principal component of the condenser charge wave form and passes easily through a narrow band-pass filter 55. The output of this filter 55 is then rectified by the rectifier 56 whose output is in turn passed through a low-pass filter 57 and delivered as a steady negative voltage to the control terminal 58 of the switch $S_2$. Thus there is applied to the control terminal 58 of the switch $S_2$ a steady or very slowly varying voltage whose amplitude is substantially proportional to the amplitude of the 4-kilocycle component in the incoming pulse sequence.

As described hereinabove in connection with the transmitter apparatus, 4-kilocycle pulses are superposed on the first digit pulses of channel No. 1. Therefore when the decoder 29 and the receiver ring circuit are correctly aligned or framed, the momentary closures of the switch $S_3$ occur at the instants when the first digit pulses of the pulse sequence of channel No. 1 arrive at the upper conduction terminal 45 of this switch. Under these conditions a substantial steady voltage appears at the control terminal 58 of the switch $S_2$ and holds this switch open in the position shown by the solid line. However, under any other condition of the alignment, substantially no voltage appears at the control terminal 58 of the switch $S_2$. This switch then closes adopting the position indicated by the broken line, and establishing a connection, by way of the upper conduction terminal 59 of the switch $S_2$, from the control terminal 61 of the switch $S_1$ to the lower conduction terminal 60 of the switch $S_2$. To this lower conduction terminal 60 of the switch $S_2$ there are applied a sequence of pulses at a rate equal to some suitable submultiple, for example one-tenth, of the sampling rate. These pulses may conveniently be derived by a frequency division process from the pulsing output of some suitable stage of the receiver ring circuit. For example, they may be derived by a 10 to 1 step-down multivibrator 64 controlled as indicated by the pulse output of some other stage, for example No. 9 of the ring circuit. A delay device 65 may be included in this path to compensate for delays in other parts of the system, thus bringing the pulses applied to the lower conduction terminal 60 of the switch $S_2$ into time coincidence with the particular ones of the 672-kilocycle pulses which control the tripping of the 7 to 1 step-down multivibrator 40.

Thus, with the switch $S_2$ closed in the position indicated by the broken line, short pulses recurring at a rate of 800 cycles per second (one tenth of 8 kilocycles per second) are applied to the control terminal 61 of the switch $S_1$, each one opening this switch briefly and so blocking one incoming pulse from the multivibrator 40. Inasmuch as the signal code pulses are appearing at the upper conduction terminal 62 of the switch $S_1$ at the rate of 672 kilocycles per second, switch $S_1$ is opened for one pulse out of every 840 pulses, and this one pulse is blocked or withheld from the multivibrator 40.

As explained above, the 7 to 1 multivibrator 40 which controls the decoder 29 and the ring circuit normally executes one full cycle for seven incoming control pulses. However, when the last of a group of seven such pulses which would normally trip this multivibrator is withheld from it, it will trip instead on the eighth pulse, thus requiring eight pulses instead of seven for a full cycle. This occurs once in every 840 pulses or once in every 120 full cycles of the 7 to 1 step-down multivibrator 40. As a result the stepping around of the receiver ring circuit and the measurement of the decoder condenser charge are delayed by one pulse position or one-seventh of a stepping period, once in every 120 steps.

After the withholding of a pulse by the momentary opening of the switch $S_1$, the latter remains closed for the ensuing 839 pulses, and the 7 to 1 step-down multivibrator therefore executes 120 cycles of its oscillations. Since each cycle results in stepping the conduction condition of the ring along by one stage, it follows that the receiver ring is thus stepped along without interruption for 120 stages or ten full revolutions, while ten successive pulse code groups of each of twelve different interlaced channels are decoded by the decoder 29. This allows time for the 4-kilocycle component of the charge of the storage condenser 47, if present, to build up a 4-kilocycle current in the band-pass filter 55 and therefore to provide security against incorrect opening of the switch $S_2$ by any 4-kilocycle component which might be present briefly when the receiver is incorrectly framed. A band width of 500 cycles for the filter 55 has been found satisfactory, allowing the 4-kilocycle current to build up to a safe margin during the 840-pulse pause while still effectively excluding currents of other frequencies. If, after the lapse of 840 pulses or $^1/_{800}$ second no substantial current has built up in the filter 55, another pulse is skipped by another momentary opening of the switch $S_1$ whereupon the process is repeated, the last one of these 120 cycles being prolonged to $^8/_7$ of its normal period and the ensuing cycle starting later than it otherwise would by just that amount. This whole sequence of events can take place 84 successive times, corresponding to the successive testing of each of seven pulse positions in each of twelve channels, in one-tenth second or less; i. e., before a subscriber becomes aware of anything amiss, correct framing will have been restored.

To summarize, in the absence of a 4-kilocycle component in the pulse position sampled by the switch $S_3$ the measurement of the decoder condenser charge and the stepping of the receiver ring circuit are delayed by one-seventh of the normal stage stepping period, once in every ten full revolutions of the ring, until the receiver is framed.

It results from these operations that the hunting time is efficiently utilized in that almost the entire available time is expended under relatively stationary conditions between the receiver ring and the transmitter ring so that each pulse position of the incoming train may be carefully scrutinized and accurately tested to determine whether or not it contains the desired 4-kilocycle framing component.

During the hunting process there are times at which the decoding of individual code groups is correctly carried out and other times at which it is incorrect. The channel distribution, on the other hand, is always incorrect until framing has been achieved. To prevent incorrect routing of the message information, whether correctly decoded or not, to the outgoing channels $L'_{1'}$, $L'_{2'}$, etc., while the hunting process is in progress, the switch $S_5$ in the incoming multiplexed message line is opened by a spring 66 while hunting is in progress. When framing is correct, the steady output of the low-pass filter 57 actuates a relay 67 and closes this switch.

Figure 5:
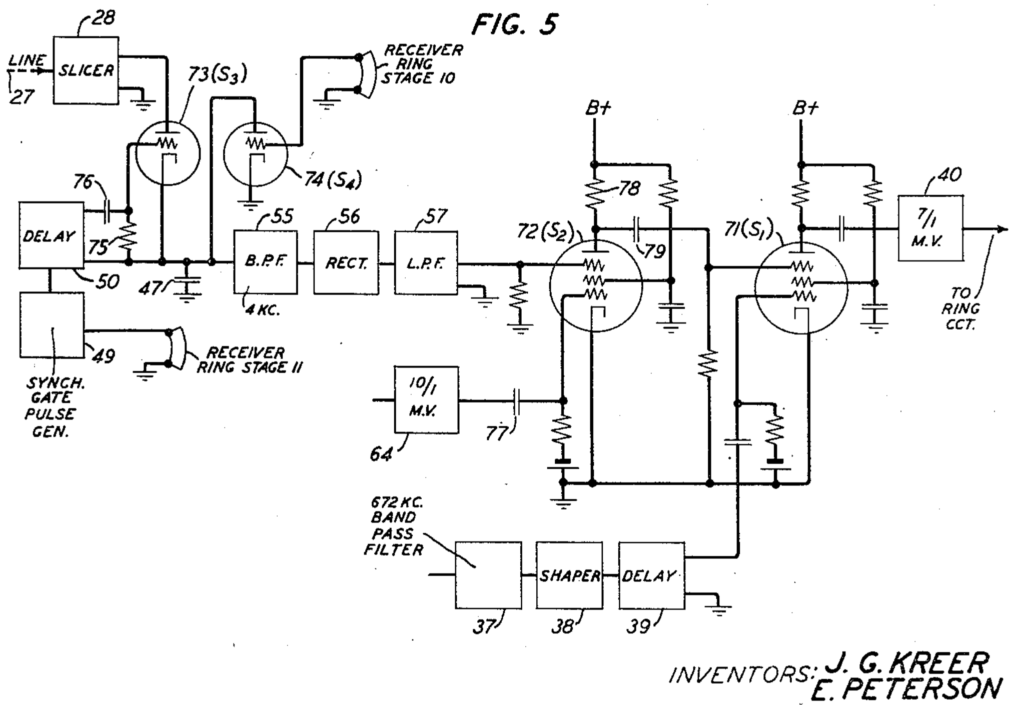
Fig. 5 is a circuit diagram of portions of the apparatus of Fig. 2 and there indicated schematically.

The electronic switches $S_1$, $S_2$, $S_3$ and $S_4$ may be of any desired type, but preferred arrangements therefor are shown in Fig. 5, wherein switches $S_1$ and $S_2$ are pentodes 71, 72 and $S_3$ and $S_4$ are triodes 73, 74. Thus, the incoming pulse sequence after passing through the slicer 28 is applied to the anode of the tube 73, which is normally cut off by grid rectification due to the resistor-condenser combination 75, 76 while the output of the synchronizing gate pulse generator 49 controlled by stage 11 of the receiver ring, is applied across the resistor 75 between the cathode and the control grid of this tube. When a synchronizing gate pulse is thus applied to the control grid, conduction takes place, and if at that instant a pulse voltage appears on the anode of this tube, i. e., on the upper conduction terminal of the switch $S_3$, the storage condenser 47 connected between the cathode of the tube 73 and ground is charged. The ungrounded terminal of the condenser 47 is also connected to the anode of the triode 74, whose cathode is grounded and whose control grid is connected to stage 10 of the receiver ring circuit. Thus when stage 10 of the ring circuit delivers its output pulse, the condenser 47 is effectively short-circuited to ground through the low impedance conduction path of the triode 74.

The voltage of the condenser 47 is applied by way of the band-pass filter 55, the rectifier 56 and the low-pass filter 57 to one control grid, for example, the third grid, of a pentode 72, while the 800-cycle pulses from the 10 to 1 step-down multivibrator 64 are applied by way of a coupling condenser 77 to the first or control grid of the same tube. The anode and screen grid of this tube are energized from any desired potential source B+ and the output is taken across the anode resistor 78 and through a coupling condenser 79 to the third grid of the pentode 71, which is normally conductive.

Thus, in the absence of the steady negative voltage output of the low-pass filter 57 the tube 72 remains conductive. Positive 800-cycle pulses from the 10 to 1 step-down multivibrator 64 applied to its first grid are transferred by this tube as an amplifier to the third grid of the tube 71 where they appear as negative pulses, thus intermittently rendering the tube 71 non-conductive, i. e., opening the circuit from the 672-kilocycle filter 37 to the 7 to 1 step-down multivibrator 40 and causing one pulse in 840 to be blocked. When, however, sufficient steady negative voltage output of the low-pass filter 57 is applied to the third grid of the tube 72, the latter remains blocked, the 800-cycle pulse output of the 10 to 1 step-down multivibrator 64 is prevented from reaching the tube 71, and the latter remains conductive, passing 672-kilocycle pulses from the band-pass filter 37 to the 7 to 1 step-down multivibrator 40 in unbroken sequence.

In the foregoing description the particular frequencies, pulse rates, etc., step-down ratios, etc., are to be understood as illustrative only.

While described in connection with a preferred embodiment employing pulse code modulation of each message signal and time division multiplexing of a plurality of such signals, it will be evident that the invention is equally applicable to time division multiplex transmission of signals in which the on-or-off pulse code is omitted, successive samples of the various signals being transmitted, for example, in the form known as pulse amplitude modulation, pulse position modulation, pulse length modulation or the like. In this case the synchronizing signal may take the form of any regularly recurrent feature of the pulses. Similarly, the invention is equally applicable to transmission of a single message by pulse code modulation without the time division multiplexing of other messages therewith. In this case the ring circuits, at the transmitter and at the receiver, degenerate into multivibrators, i. e., into single stage rings.

The various apparatus elements shown in the drawings as blocks, and as to which constructional details have not been given in the foregoing description, may be conventional. Thus, each of the pulse shapers 13, 14, 24, 38, 41, 42 may comprise a common resistance-capacitance differentiating circuit. In the case of those which are fed by smooth waves, such as 13 and 38, it is preferred to amplify and limit the waves in conventional fashion before applying them to the differentiating circuit. Differentiating circuits are shown to be thus employed for wave-shaping purposes in Electronics for August 1942, at page 48.

With the exception of the delay device 65, each of the various short-time delay devices shown may comprise a reactive electromagnetic transmission line, whose length is selected to give, in terms of the propagation speed along the line, the required time delay. Lines which have been found by test to be entirely suitable are described in the Proceedings of the I. R. E., vol. 34, page 348 (June 1946).

The delay device 65 is required to provide a delay which, if generated by an electromagnetic line, would require a line of inconveniently great length. It is common in such a situation to employ as the delay device a monostable or "single trip" multivibrator of conventional construction as shown, for example in "Time Bases" by O. S. Puckle (Wiley 1946) at page 59.

The pulse generators 22, 25, 49 may again be of any desired type, but a very convenient one comprises a short-circuited reflecting delay line connected in the output circuit of a buffer tube as shown, for example, in Levy et al. Patent 2,433,379. Such an arrangement is also shown in Electronics for August 1942, page 50.

A conventional single trip multivibrator is for most purposes equally serviceable.

Large numbers of variants of the foregoing arrangements are shown in "Wave Forms" by Chance et al., Radiation Laboratory Series vol. 19, especially at sections 5.5, 5.8, 5.10, 18.5, and 22.

What is claimed is:

1. In a communication system, a plurality of incoming channels, time division multiplex equipment for sampling incoming complex waves on said channels in rotation at a preassigned rate, apparatus for transmitting pulses representing said samples, a receiving station, a similar plurality of channels extending from said receiving station, multistage means for distributing incoming signals to said channels in rotation at said preassigned rate, means for applying stepping pulses to said distributing means to advance said distributing means stepwise under control of the pulses of an incoming pulse train, a path extending from one stage of said distributing means to said pulse-applying means for intermittently blocking a single one of a preassigned number of said pulses, thereby effecting a brief pause in said step-by-step advance, means for examining the successive pulses of said incoming train in turn, and apparatus responsive to synchronous operation of said distributing means for breaking said pulse-blocking path.

2. In a communication system, an incoming channel, equipment for repeatedly sampling an incoming complex wave on said channel at a preassigned rate, apparatus for transmitting a group of pulses representing each of said samples, a receiving station, a similar channel extending from said receiving station, translating means having an output terminal for reconstituting successive samples of said complex wave from said pulse groups at said preassigned rate, means for applying stepping pulses to said translating means to advance said translating means stepwise under control of the pulses of an incoming pulse train, a path extending from said output terminal to said pulse-applying means for intermittently blocking predetermined ones of said pulses, thereby effecting pauses in said step-by-step advance and apparatus responsive to synchronous operation of said receiving equipment for breaking said pulse-blocking path.

3. In a communication system, a plurality of incoming channels, time division multiplex equipment for sampling incoming complex waves on said channels in rotation, apparatus for transmitting pulses representing said samples, a receiving station, a similar plurality of channels extending from said receiving station, a ring circuit for distributing incoming signals to said channels in rotation, means for normally advancing said ring circuit in step-by-step fashion under control of incoming pulses, a path extending from said ring circuit to said advancing means for periodically suppressing a controlling pulse, and apparatus responsive to synchronous operation of said ring circuit for rendering said pulse-suppression apparatus ineffective.

4. In a communication system, an incoming channel, equipment for repeatedly sampling an incoming complex wave on said channel, apparatus for translating each of said samples into a pulse group of a preassigned number of on-or-off digit pulses occurring in time sequence, apparatus for transmitting said pulses, means for generating a synchronizing signal, means for modifying a selected one of the digit pulses of each group by said synchronizing signal, a receiving station, a channel extending from said receiving station, translating means operating isochronously with the incoming pulses for reconstituting a wave sample from a like number of pulses, means for applying stepping pulses to said translating means to advance said translating means stepwise under control of the pulses of an incoming pulse train, means including a path extending from said translating means to said pulse-applying means for intermittently blocking a single one of the preassigned number of said pulses, thereby effecting a pause in said step-by-step advance, means for examining the individual digit pulses in turn, means for registering said synchronizing signal when present, and a path extending from said synchronizing signal registering means to said pulse-blocking means for disabling said pulse-blocking means in response to the presence of said synchronizing signal in a selected position on the time scale.

5. In a pulse communication system, a receiver adapted to reconstitute message signal samples from incoming code pulse groups, a plurality of channels extending from said receiver, a ring circuit for distributing said samples to said channels in rotation, means for normally advancing said ring circuit stepwise under control of said incoming pulses, a path extending from said advancing means for periodically withholding a controlling pulse from said ring circuit, and apparatus responsive to synchronous operation of said receiver for rendering said pulse-withholding apparatus ineffective.

6. In a communication system, a plurality of incoming channels, time division multiplex equipment for sampling incoming complex waves on said channels in rotation, apparatus for translating each of said samples into a pulse group of a preassigned number of on-or-off digit pulses occurring in time sequence, apparatus for transmitting said pulse groups, means for generating a synchronizing signal, means for modifying a selected one of the digit pulses of each group corresponding to a selected channel by said synchronizing signal, a receiving station, a similar plurality of channels extending from said receiving station, translating equipment for reconstituting a wave sample from a like number of pulses, multistage means for distributing said reconstituted wave samples to said channels in rotation, means for applying stepping pulses to said distributing means to advance said distributing means stepwise under control of the pulses of an incoming pulse train, a path extending from one stage of said distributing means to said pulse-applying means for intermittently blocking predetermined ones of said pulses, thereby effecting pauses in said step-by-step advance, means for examining the digit pulses in sequence, means for registering said synchronizing signal when present, and a path extending from said synchronizing-signal-registering means to said pulse-blocking means for disabling said pulse-blocking means in response to the presence of said synchronizing signal in time-coincidence with said selected digit pulse.

7. In a communication system, a plurality of incoming channels, time division multiplex equipment for sampling incoming complex waves on said channels in rotation, apparatus for translating each of said samples into a pulse group of a preassigned number of on-or-off digit pulses occurring in time sequence, apparatus for transmitting said pulse groups, means for generating a synchronizing signal, means for modifying a selected one of the digit pulses of each group corresponding to a selected channel by said synchronizing signal, a receiving station, a similar plurality of channels extending from said receiving station, translating equipment for reconstituting a wave sample from a like number of pulses, a multiplex equipment for distributing said reconstituted wave samples to said channels in rotation, means for applying stepping pulses to said distributing means to advance said distributing means stepwise under control of the pulses of an incoming pulse train, a path extending from one stage of said distributing means to said pulse-applying means for intermittently blocking predetermined ones of said pulses, thereby effecting pauses in said step-by-step advance, means for examining the digit pulses in sequence, means for registering said synchronizing signal when present, and a path extending from said synchronizing-signal-registering means to said distributing means for disabling said distributing means when said pulse-blocking means is in action.

8. In a pulse code communication receiver adapted to reconstitute message signal samples from incoming code pulse groups and to distribute said samples to outgoing channels in rotation, a pulse-controlled distributor for effecting said distribution, means for regularly applying control pulses to said distributor isochronously with the recurrence rate of said incoming pulses, means for intermittently blocking a control pulse from said distributor, means responsive to synchronous operation of said distributor for disabling said pulse-blocking means, and means for disabling said distributor while said pulse-blocking means is effective.

9. In a pulse code communication receiver, a decoder adapted to reconstitute message signal samples from successive groups of $n$ successive on-or-off pulses of an incoming code pulse train, means for deriving from said train a sequence of pulses recurring regularly at a basic timing rate, a multivibrator adapted to deliver a pulse after the application thereto of $n$ successive pulses in unbroken sequence, a normally closed switch, connections for applying the pulses of said second sequence by way of said switch to said multivibrator, connections for applying the pulses of said multivibrator to said decoder to control the grouping of said $n$ successive on-or-off code pulses, means for intermittently opening said switch to block a single pulse of said regular pulse sequence from said multivibrator, thus causing a decoded pulse group to start with a later pulse position, and means responsive to synchronous operation of said receiver for disabling said pulse-blocking means.

10. In a pulse code communication receiver, means for deriving from a train of incoming code pulses a sequence of pulses recurring regularly at a basic timing rate, means for translating successive pulse groups of said incoming train into wave samples, means for reconstituting a signal wave from said samples, means operated by the pulses of said sequence for repeatedly examining a single particular pulse position of said train, means controlling said pulse-position-examining means for blocking a preassigned fraction of the pulses of said sequence to cause said pulse-position-examining means to examine an adjacent pulse position, means for deriving a signal when the pulse-position examined contains pulses having a preassigned marker characteristic, and means operated by said signal for disabling said pulse-blocking means.

11. In a pulse code communication receiver, means for deriving from a train of incoming code pulses a sequence of pulses recurring regularly at a basic timing rate, means for translating successive groups of N on-or-off pulses into wave samples, a multivibrator controlled by the pulses of said regular sequence for generating a second sequence of pulses whose frequency is $$\frac{1}{N}$$

times the frequency of the pulses of said first sequence, a ring circuit of S stages, stepped by the pulses of said second sequence, for distributing successive wave samples into S channels in rotation, means for examining the various pulse positions of said train, means for deriving a third pulse sequence from one stage of said ring circuit and having a frequency of $$\frac{1}{NSB}$$

times the frequency of the pulses of said first sequence, where B is an integral build-up factor, means controlled by the pulses of said third sequence for blocking $$\frac{1}{NSB}$$

of the pulses of said first sequence from said multivibrator to cause one half-cycle of its oscillations to be extended in the ratio $$\frac{N+1}{N}$$

and hence causing said pulse-position-examining means to examine an adjacent pulse position, means for deriving a signal from said pulse-position-examining means when the pulse position examined contains pulses having a preassigned marker characteristic, and means operated by said signal for disabling said pulse-blocking means within a number B of cycles of said first pulse sequence.

12. In a pulse code communication received adapted to reconstitute message signal samples from incoming code pulse groups and to distribute said samples to outgoing channels in rotation, a pulse-controlled distributor for effecting said distribution, means for regularly applying control pulses to said distributor isochronously with the recurrence rate of said incoming pulses, means for intermittently blocking a control pulse from said distributor, and means responsive to synchronous operation of said distributor for disabling said pulse-blocking means.

13. In a pulse code communication receiver adapted to reconstitute message signal samples from groups of pulses of an incoming train and to distribute said samples to outgoing channels in rotation, said incoming train including a marker pulse located in a preassigned pulse position, a pulse-controlled multistage distributor for effecting said distribution, a first normally closed switch having a control terminal and conduction terminals, means for applying stepping pulses by way of the conduction terminals of said first switch to said distributor to advance it in step-by-step fashion, a second normally closed switch having conduction terminals and a control terminal, a path extending from one output stage of said distributor by way of the conduction terminals of said second switch to the control terminal of said first switch for intermittently opening said first switch to block a single one of the stepping pulses from said distributor in one of a preassigned number of revolutions of said distributor, means controlled by one output stage of said distributor for examining each of the various pulse positions of said incoming train for the presence in that pulse position of a marker pulse, means for registering said marker pulse when present, and means under control of said marker-pulse-registering means for opening said second switch when a pulse position is discovered to contain the marker pulse, thereby terminating the intermittent opening of the first switch and allowing the application of the pulses of the second sequence to the distributor to proceed without interruption.

14. In a pulse code communication receiver, means for deriving from a train of incoming on-or-off code pulses a first sequence of pulses recurring regularly at a basic timing rate, means for converting successive groups of N of said on-or-off pulses into wave samples, a pulse frequency divider controlled by the pulses of said first regular sequence for generating a second sequence of pulses whose frequency is $$\frac{1}{N}$$

times the frequency of the pulses of said first regular sequence, a number of outgoing channels, a ring circuit for distributing successive wave samples into said channels in rotation, a first normally closed switch having conduction terminals and a control terminal, means for applying the pulses of said second sequence by way of the conduction terminals of said first switch to said ring circuit to advance it in step-by-step fashion, a second normally closed switch having conduction terminals and a control terminal, a path extending from one output stage of said ring circuit by way of the conduction terminals of said second switch to the control terminal of said first switch for intermittently opening said first switch to block a single one of the pulses of said second sequence from said ring circuit, means controlled by one output stage of said ring circuit for examining each of the various pulse positions of said incoming train for the presence in that pulse position of a marker pulse, means for registering said marker pulse when present, and a path extending from said marker-pulse-registering means to the control terminal of said second switch for opening said second switch when a pulse position is discovered to contain the marker pulse, thereby terminating the intermittent opening of the first switch and allowing the application of the pulses of the second sequence to the ring circuit to proceed without interruption.

15. In a pulse code communication receiver, means for deriving from a train of incoming on-or-off code pulses a sequence of pulses recurring regularly at a basic timing rate, means for converting successive groups of N of said on-or-off pulses into wave samples, a first pulse frequency divider controlled by the pulses of said first regular sequence for generating a second sequence of pulses whose frequency is $$\frac{1}{N}$$

times the frequency of the pulses of said first regular sequence, a ring circuit of S stages for distributing successive wave samples into S channels in rotation, a first normally closed switch having conduction terminals and a control terminal, means for applying the pulses of said second sequence by way of the conduction terminals of said first switch to said ring circuit to advance it in step-by-step fashion, a second normally closed switch having conduction terminals and a control terminal, a second pulse frequency divider for generating a sequence of pulses at a rate $$\frac{1}{B}$$

times the rate of pulses applied to it, a path extending from one output stage of said ring circuit by way of said second frequency divider and by way of the conduction terminals of said second switch to the control terminal of said first switch for intermittently opening said first switch to block a single one of the pulses of said second sequence from said ring circuit in one of a preassigned number of revolutions of said ring circuit, means controlled by one output stage of said ring circuit for examining each of the various pulse positions of said incoming train for the presence in that pulse position of a marker pulse, means for registering said marker pulse when present, and a path extending from said marker-pulse-registering means to the control terminal of said second switch for opening said second switch when a pulse position is discovered to contain the marker pulse, thereby terminating the intermittent opening of the first switch and allowing the application of the pulses of the second sequence to the ring circuit to proceed without interruption.

JOHN G. KREER, Jr.
EUGENE PETERSON.

REFERENCES CITED

The following references are of record in the file of this patent:

UNITED STATES PATENTS

| Number | Name | Date |
|---|---|---|
| 2,021,743 | Nicolson | Nov. 19, 1935 |
| 2,182,000 | Nichols | Dec. 5, 1939 |
| 2,230,820 | Young | Feb. 4, 1941 |
| 2,246,284 | Artz | June 17, 1941 |
| 2,418,116 | Grieg | Apr. 1, 1947 |
| 2,438,908 | Goodall | Apr. 6, 1948 |